(12) United States Patent
Zhong et al.

(10) Patent No.: US 8,885,011 B2
(45) Date of Patent: Nov. 11, 2014

(54) METHOD FOR IMPLEMENTING VIDEO CALL WITH BLUETOOTH-BASED HEADSET AND VIDEO COMMUNICATION TERMINAL FOR THE SAME

(75) Inventors: Rili Zhong, Huizhou (CN); Xianglai Li, Huizhou (CN); Jinggao Zhou, Huizhou (CN)

(73) Assignee: Huizhou TCL Mobile Communication Co., Ltd., Huizhou, Guangdong (CN)

( * ) Notice: Subject to any disclaimer, the term of this patent is extended or adjusted under 35 U.S.C. 154(b) by 103 days.

(21) Appl. No.: 13/878,896

(22) PCT Filed: Jul. 4, 2011

(86) PCT No.: PCT/CN2011/076817
§ 371 (c)(1),
(2), (4) Date: Apr. 11, 2013

(87) PCT Pub. No.: WO2012/051870
PCT Pub. Date: Apr. 26, 2012

(65) Prior Publication Data
US 2013/0201275 A1     Aug. 8, 2013

(30) Foreign Application Priority Data
Oct. 22, 2010   (CN) .......................... 2010 1 0518883

(51) Int. Cl.
*H04N 7/14*      (2006.01)
*H04M 1/60*      (2006.01)

(52) U.S. Cl.
CPC ............. *H04N 7/147* (2013.01); *H04M 1/6066* (2013.01); *H04N 7/142* (2013.01); *H04N 2007/145* (2013.01)
USPC ...................... 348/14.02; 340/505; 348/14.08; 379/390.01; 455/405; 455/550.1; 455/570; 704/212; 709/227

(58) Field of Classification Search
CPC ....... H04N 7/147; H04W 4/14; H04W 72/02; H04B 5/0037; H04M 7/0057; H04L 2012/2841
USPC ........ 340/505; 348/14.02, 14.08; 379/390.01; 455/405, 550.1, 570; 704/212; 709/227
See application file for complete search history.

(56) References Cited

U.S. PATENT DOCUMENTS 8,219,063 B2 *    7/2012   Rogel et al. ................... 455/405
8,320,974 B2 *   11/2012   Nicholson ..................... 455/570
(Continued)

FOREIGN PATENT DOCUMENTS

CN           101246417          8/2008
CN           101360141          2/2009
(Continued)

OTHER PUBLICATIONS

International Search Report mailed Sep. 29, 2011 for PCT/CN2011/076817, citing the above reference(s).

*Primary Examiner* — Gerald Gauthier
(74) *Attorney, Agent, or Firm* — Lowe Hauptman & Ham, LLP

(57) ABSTRACT

Disclosed are a method for implementing a video call with a Bluetooth-based headset and a video communication terminal. The method includes: looking up a Bluetooth headset; starting a VTCALL unit of the AP module and an AG unit; sending a VTCALL command and an AG command to the audio module; switching an audio channel to a BTVTCALL channel; starting a recording and playing mode of the video communication terminal, collecting uplink and downlink audio data, and transmitting the uplink and the downlink audio data to the Bluetooth module; transmitting the uplink and the downlink audio data to the Bluetooth headset; executing the data exchange with the Bluetooth headset for implementing a Bluetooth video call. The present invention implements the Bluetooth video call by modifying software, thereby using the current hardware resources and decreasing the cost.

15 Claims, 10 Drawing Sheets

(56) References Cited

U.S. PATENT DOCUMENTS

| | | | |
|---|---|---|---|
| 8,378,807 B2 * | 2/2013 | Lee et al. | 340/505 |
| 8,751,667 B2 * | 6/2014 | Santamaria et al. | 709/227 |
| 8,781,820 B2 * | 7/2014 | Seguin | 704/212 |
| 2008/0024593 A1 * | 1/2008 | Tsirinsky et al. | 348/14.08 |
| 2009/0253457 A1 * | 10/2009 | Seguin | 455/550.1 |
| 2010/0080379 A1 * | 4/2010 | Chen et al. | 379/390.01 |
| 2010/0159834 A1 | 6/2010 | Walsh et al. | |
| 2013/0201275 A1 * | 8/2013 | Zhong et al. | 348/14.02 |

FOREIGN PATENT DOCUMENTS

| | | |
|---|---|---|
| CN | 101388996 | 3/2009 |
| CN | 101388996 A | 3/2009 |
| CN | 101984728 | 3/2011 |

\* cited by examiner

METHOD FOR IMPLEMENTING VIDEO CALL WITH BLUETOOTH-BASED HEADSET AND VIDEO COMMUNICATION TERMINAL FOR THE SAME

CROSS REFERENCE TO RELATED APPLICATION

This application claims the priority of Chinese Patent Application No. 201010518883.7, filed on Oct. 22, 2010 in the SIPO (State Intellectual Property Office of the P.R.C). Further, this application is the National Phase application of International Application No. PCT/CN2011/076817 filed Jul. 4, 2011, which designates the United States and was published in Chinese.

FIELD OF THE INVENTION

The present invention generally relates to video call technologies, and more particularly to a method for implementing a video call with a Bluetooth-based headset and a video communication terminal for the same.

BACKGROUND

With the widespread video calls and applications on 3G (3rd-generation) mobile phones, people utilize various audio devices (Bluetooth headsets) to connect with the 3G mobile phones for executing the video calls more and more. Same as general video calls, a problem that how to transmit uplink and downlink voices to the audio devices (Bluetooth headsets) also exists when the Bluetooth headsets are utilized for executing the video calls.

Nowadays, technical contradictions exist on hardware when the Bluetooth video calls are designed according to a conventional framework of the video calls. A conventional solving method is to restructure hardware interfaces without changing the overall framework, so as to avoid the technical contradictions.

However, the above-mentioned method is restricted to functions of Bluetooth chips and not compatible with the Bluetooth headsets which do not support A2DP (Advanced Audio Distribution Profile, i.e. stereo headsets). As a result, the 3G mobile phones supporting the Bluetooth headsets to execute the video calls are not yet on the market.

Accordingly, the prior arts still need to be improved and advanced.

SUMMARY OF THE INVENTION

The present invention is to provide a method for implementing a video call with a Bluetooth-based headset and a video communication terminal capable of executing the video call with a Bluetooth headset.

To achieve the above-mentioned objective, the present invention adopts the following scheme: a method for implementing a video call with a Bluetooth-based headset, the method comprising the following steps:

(A) turning on a video communication terminal;
(B) an AP module of the video communication terminal looking up a Bluetooth headset matching the video communication terminal;
(C) starting a VTCALL unit of the AP module and an AG unit of a Bluetooth module;
(D) the AP module sending a VTCALL command and an AG command to the audio module;
(E) the audio module switching an audio channel to a BTVTCALL channel according to the VTCALL command and the AG command, the step (E) comprising:
(E1) setting a GPIO function of the AP module, so as to reverse SSP4 TX and RX of the AP module;
(E2) amending a send buffer address of playing as SSP4;
(E3) setting an SSP4 interface of the AP module as a PCM slave mode;
(E4) setting a physical sampling rate of the playing to be the same as a sampling rate of PCM of recording;
(E5) setting a gain of a downlink voice of the Bluetooth headset through the Bluetooth module;
(F) the audio module starting a recording and playing mode of the video communication terminal, collecting uplink and downlink audio data, and transmitting the uplink and the downlink audio data to the Bluetooth module;
(G) the Bluetooth module transmitting the uplink and the downlink audio data to the Blutooth headset;
(H) a CP DBB module, the AP module, the audio module and the Bluetooth module executing the uplink and the downlink audio data exchange with the Bluetooth headset for implementing a Bluetooth video call;
(I) turning off the AP module, the Bluetooth module and the audio module for ending the Bluetooth video call;
(J) recovering the audio channel in a normal operation mode.

A method for implementing a video call with a Bluetooth-based headset, the method comprises the following steps:

(A) turning on a video communication terminal;
(B) an AP module of the video communication terminal looking up a Bluetooth headset matching the video communication terminal;
(C) starting a VTCALL unit of the AP module and an AG unit of a Bluetooth module;
(D) the AP module sending a VTCALL command and an AG command to the audio module;
(E) the audio module switching an audio channel to a BTVTCALL channel according to the VTCALL command and the AG command;
(F) the audio module starting a recording and playing mode of the video communication terminal, collecting uplink and downlink audio data, and transmitting the uplink and the downlink audio data to the Bluetooth module;
(G) the Bluetooth module transmitting the uplink and the downlink audio data to the Bluetooth headset;
(H) a CP DBB module, the AP module, the audio module and the Bluetooth module executing the uplink and the downlink audio data exchange with the Bluetooth headset for implementing a Bluetooth video call.

The method for implementing the video call with the Bluetooth-based headset further comprises the following steps after the step (H):

(I) turning off the AP module, the Bluetooth module and the audio module for ending the Bluetooth video call;
(J) recovering the audio channel in a normal operation mode.

The method for implementing the video call with the Bluetooth-based headset further comprises the following step before the step (C):

(C0) the AP module executing a VTCALL dialing.

In the method for implementing the video call with the Bluetooth-based headset, the step (E) further comprises:

(E1) setting a GPIO function of the AP module, so as to reverse SSP4 TX and RX of the AP module;
(E2) amending a send buffer address of playing as SSP4;
(E3) setting an SSP4 interface of the AP module as a PCM slave mode;

(E4) setting a physical sampling rate of the playing to be the same as a sampling rate of PCM of recording;

(E5) setting a gain of a downlink voice of the Bluetooth headset through the Bluetooth module.

In the method for implementing the video call with the Bluetooth-based headset, the normal operation mode comprises a general voice recording and playing operation mode and a general Bluetooth call mode.

In the method for implementing the video call with the Bluetooth-based headset, when the audio module transmits the audio data to the Bluetooth module, the uplink and the downlink audio data are transmitted in a full duplex through PCM ports.

A video communication terminal for implementing a video call with a Bluetooth-based headset, the video communication terminal, which is a 3G mobile phone, comprises:

an AP module for implementing various interface operations of the video communication terminal; an audio module for switching an audio channel to a BTVTCAL channel, then collecting uplink and downlink audio data, and transmitting the uplink and downlink audio data to a Bluetooth module; the Bluetooth module for executing data transmission; and a CP DBB module for executing data transmission with the AP module, the AP module linked with the audio module and the CP DBB module, the Bluetooth module linked with the AP module, the audio module and a Bluetooth headset;

amongst, the AP module comprises a system layer and a VTCALL unit, the system layer is utilized for looking up the Bluetooth headset matching the video communication terminal, executing a VTCALL dialing, turning on the VTCALL unit and an AG unit of the Bluetooth module; the VTCALL unit is utilized for sending a VTCALL command to the audio module.

A video communication terminal for implementing a video call with a Bluetooth-based headset, comprises:

an AP module for implementing various interface operations of the video communication terminal; an audio module for switching an audio channel to a BTVTCAL channel, then collecting uplink and downlink audio data, and transmitting the uplink and downlink audio data to a Bluetooth module; and the Bluetooth module for executing data transmission; the AP module linked with the audio module, the Bluetooth module linked with the AP module, the audio module and a Bluetooth headset;

amongst, the AP module comprises a system layer and a VTCALL unit, the system layer is utilized for looking up the Bluetooth headset matching the video communication terminal, executing a VTCALL dialing, turning on the and an AG unit of the Bluetooth module; the VTCALL unit is utilized for sending a VTCALL command to the audio module.

The video communication terminal for implementing the video call with the Bluetooth-based headset further comprises a CP DBB module for executing data transmission with the AP module, the CP DBB module is linked with the AP module.

In the video communication terminal for implementing the video call with the Bluetooth-based headset, the video communication terminal is a 3G mobile phone.

The method for implementing the video call with the Bluetooth-based headset and the video communication terminal modify software to change the PLAYBACK channel from the original SSP3 I2S mode to the SSP4 PCM mode (Pulse Code Modulation), and to change the RECORD channel from the original AP module/audio module to the AP module/Bluetooth module mode, and link the other modules including the AP module, the Bluetooth module and the SCO (synchronous connection-oriented) by the AG unit, thereby implementing the Bluetooth video call and achieving the following benefits without modifying the hardware design.

First, in a situation that the hardware design is not modified, the Bluetooth video call is implemented by modifying the software, and the PLAYBACK and the RECORD are transmitted through the PCM ports of the audio module and the Bluetooth module in the full duplex operation. The current hardware resources are used sufficiently, and the cost is decreased significantly.

Second, the uplink and the downlink audio data are transmitted in SCO, which only requires that the Bluetooth headset supports the SCO function and is compatible with the Bluetooth headset which does not support A2DP (stereo Bluetooth headset). As a result, the Bluetooth video call is really implemented, and requirements for the Bluetooth headset are not restricted. The application range is wide, thereby increasing a usage range of the video communication terminal.

For the unified management, the present invention mainly modifies the audio drive (i.e. the audio module). The other modules are coordinated with and adjusted without being modified greatly. This includes two advantages. The first advantage is a high portability. Since transferring several modules is more complicated than transferring one module at the time of transferring the functions. The present invention only requires transferring the audio drive. Accordingly, the unstable phenomenon and a problem that the interfaces are disorderly do not occur. The second advantage is convenient to manage unifiedly. Transferring one module makes the flow of the link interface drive simply and efficient.

With the continuous development of the 3G technologies, the video call is increasingly important, and the usage frequency is getting high. Utilizing various audio devices for executing the video call may meet people's requirements. The usage of the Bluetooth headset is a trend, and utilizing the Bluetooth headset to make the video call is a trend as well and will be a necessary function of the video communication terminal.

BRIEF DESCRIPTION OF THE DRAWINGS

Embodiments are illustrated in accordance with the attached figures for further explanation in the following descriptions.

DETAILED DESCRIPTION OF THE INVENTION

Figure 1:
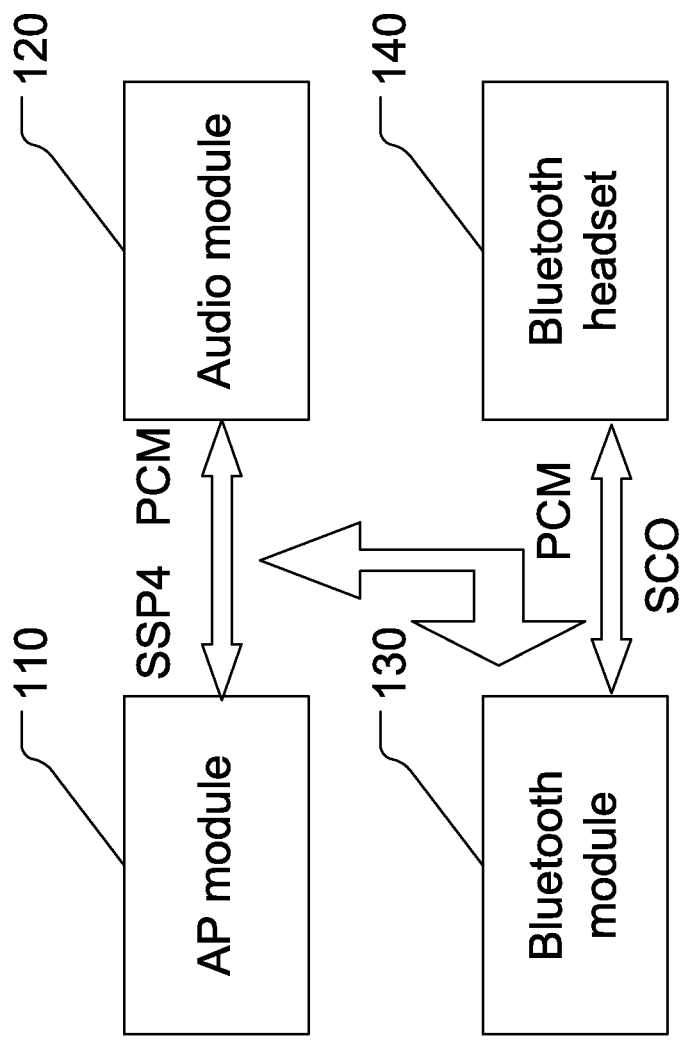
FIG. 1 illustrates a structural frame of a video communication provided by an embodiment of the present invention.

The present invention provides a method for implementing a video call with a Bluetooth-based headset and a video communication terminal for the same. To clarify objectives, technical solutions and advantages of the present invention, the present invention will be further described in detail as follow by giving embodiments with reference to the accompanying drawings. It should be understood that the embodiments herein only exemplify the present invention rather than limiting the present invention.

In order to implement a Bluetooth video call, a unique framework for a video communication terminal is designed fundamentally in an embodiment of the present invention. Firstly, a software and hardware platform for the video communication terminal is analyzed.

First, when a general voice call is considered in a Bluetooth module, an audio module internally turns on uplink and downlink paths of a CP DBB module (communication processor, i.e. communication baseband chip) and audio data of the video communication terminal is collected and transmitted by an AP module. Accordingly, it should be considered how to link the uplink and the downlink audio data with the Bluetooth module by the AP module.

Second, when the downlink audio data is transmitted in Bluetooth A2DP and the uplink audio data is transmitted in SCO, an SSP4 port of the AP module is linked with a PCM port of the Bluetooth module and a HI-Z (high impedance) port (i.e. a PCM port of the audio module) of the audio module. In this method, an audio framework is not required to be changed. However, this type of method is infeasible from acquired information. Main reasons comprises: (1) the Bluetooth module and the Bluetooth headset does not support A2DP and SCO to be operated at the same time; and (2) a Bluetooth handle does not support A2DP.

Third, when the uplink and the downlink audio data are transmitted in SCO, the SSP4 TX port (transmit port) of the AP module is linked with PCM RX port (receive port) of the Bluetooth module, the SSP4 RX port of the AP module is linked with the PCM TX port of the Bluetooth module and the HI-Z port of the audio module. In this method, the audio framework (i.e. the audio module) is required to be changed greatly as follows.

First, a PLAYBACK path is changed from an original SSP3 I2S mode to an SSP4 PCM mode, and a RECORD path is changed from an original AP module/audio module to an AP module/Bluetooth module.

Second, based on concurrent operations required by PLAYBACK and RECORD of the SSP4 port, the AP module is required to be changed greatly when inputting DMA and outputting DMA.

Third, since the PLAYBACK and the RECORD are required to be operated concurrently, a physical sampling rate and a sampling resolution are restricted. As a result, a layer for sampling rate conversion is required to be rewritten as well.

According to the above-mentioned analyses, the AP module and the Bluetooth module are linked through the PCM ports in the present implementing method. Both the uplink and the downlink audio data are transmitted in SCO. That is, the SSP4 TX port of the AP module is linked with the PCM RX port of the Bluetooth module, the SSP4 RX port of the AP module is linked with the PCM TX port of the Bluetooth module and the HI-Z port of the audio module.

Amongst, a master and slave relation of the SSP4 port of the AP module and the Bluetooth module may be adjusted flexibly. Since the conventional AP module and the Bluetooth module are both in a master mode, the present embodiment reverses the TX function and RX function of SSP4 of the AP module by a GPIO (General Purpose Input/Output) function of the AP module, thereby avoiding modifying hardware for achieving hardware compatibility.

Moreover, since the PLAYBACK and the RECORD of the SSP4 port (PCM) of the AP module are operated concurrently, the original AP module/audio module is changed to the AP module/Bluetooth module. Contents about INPUT DMA and OUTPUT DMA in the audio module are amended. That is, a send buffer address of the PLAYBACK is amended.

Since the PLAYBACK channel is changed from the original SSP3 I2S mode to the SSP4 PCM mode, the physical sampling rate of the PLAYBACK channel is required to be changed to be the same as the sampling rate of PCM (pulse code modulation) of the RECORD channel. In the present embodiment, the change can be done in the layer for sampling rate conversion of the PLAYBACK in the audio module.

Please refer to FIG. 1. The video communication terminal provided by the present embodiment of the present invention comprises an AP module 110, an audio module 120 and a Bluetooth module 130. An SSP4 port of the AP module 110 is linked with a PCM port of the audio module 120. A PCM port of the Bluetooth module 130 is respectively linked with the SSP4 port of the AP module 110 and the PCM port of the audio module 120. The Bluetooth module 130 is linked with a Bluetooth headset 140 via SCO.

Amongst, an integrated chip of marvell PXA series is utilized as the AP module 110. An audio codec chip manufactured by Dialog company is utilized as the audio module 120. A Bluetooth chip manufactured by CSR company is utilized as the Bluetooth module 130.

The AP module 110 is utilized for implementing various interface operations of the video communication terminal and comprises a system layer (not shown) and a VTCALL unit (not shown). Amongst, the system layer is utilized for looking up a Bluetooth headset matching the video communication terminal, entering a dial pad for executing a VTCALL (video telephone call) dial, turning on the audio module 120 and an AG (Audio Gateway) unit of the Bluetooth module 130, and sending an AG command to the audio module 120 and so on. The VTCALL unit is utilized for sending a VTCALL command to the audio module 120.

The audio module 120 is utilized for decoding and encoding audio signals outputted by the AP module 110 and the Bluetooth module 130, further collects uplink and downlink audio data after switching an audio channel to a BTVTCAL channel according to the AG command and the VTCALL command, and sending the uplink and the downlink audio data to the Bluetooth module. The Bluetooth module 130 is utilized for executing data transmission with the Bluetooth headset 140 according to a control command of the AP module 110.

When the uplink and the downlink voice data are transmitted in SCO in the video communication terminal, the PCM ports are utilized between the AP module 110 and the Bluetooth module 130 for implementing voice signal transmission during a Bluetooth video call. Since all of the AP module 110, the audio module 120 and the Bluetooth module 130 are coupled to the PCM bus, the video communication terminal includes the following three operational modes.

When the video communication terminal executes the Bluetooth video call, the Bluetooth module 130 is set in a master state, the AP module 110 is set in a slave state, and the PCM port of the audio module 120 is set in a high impedance state.

When the video communication terminal executes general record and playback functions, the SSP port of the AP module 110 simulates PCM timing for linking with the audio module 120. The AP module 110 is set to be in a master state, the audio module 120 is set to be in a slave state, and the PCM pin (PCM port) of the Bluetooth module 130 is required to be set in a high impedance state.

When the video communication terminal executes a function of a general Bluetooth call, the Bluetooth module 130 is set in a master state, the audio module 120 is set in a slave state, and the SSP pin (SSP port) of the AP module 110 is required to set in a high impedance state.

Figure 2:
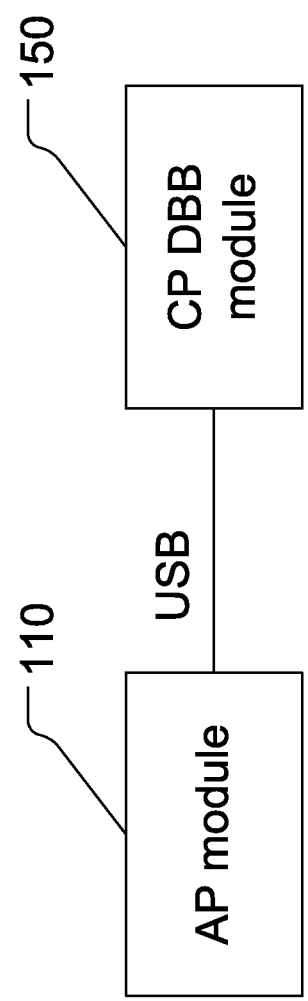
FIG. 2 illustrates a hardware frame of a communication interface of the video communication provided by the embodiment of the present invention.

Please refer to FIG. 2. The video communication terminal further comprises a CP DBB module 150 (communication baseband chip) for executing data transmission with the AP module. The CP DBB module 150 communicates with the AP module 110 through a USB port. In the present embodiment, a video communication path of the video communication terminal is the same as a conventional video telephone. The uplink and the downlink audio data between the AP module 110 and the CP DBB module 150 are communicated through the USB port.

In the uplink call, the AP module 110 sends the acquired digital uplink audio data to the CP DBB module 150 through the USB port, and then the CP DBB module 150 sends the uplink audio data through a wireless baseband; in the downlink call, the CP DBB module 150 receives the digital downlink audio data from the wireless baseband and then transmits the digital down link audio data to the AP module 110 through the USB port, thereby achieving the exchange of the uplink and the downlink audio data.

Figure 3:
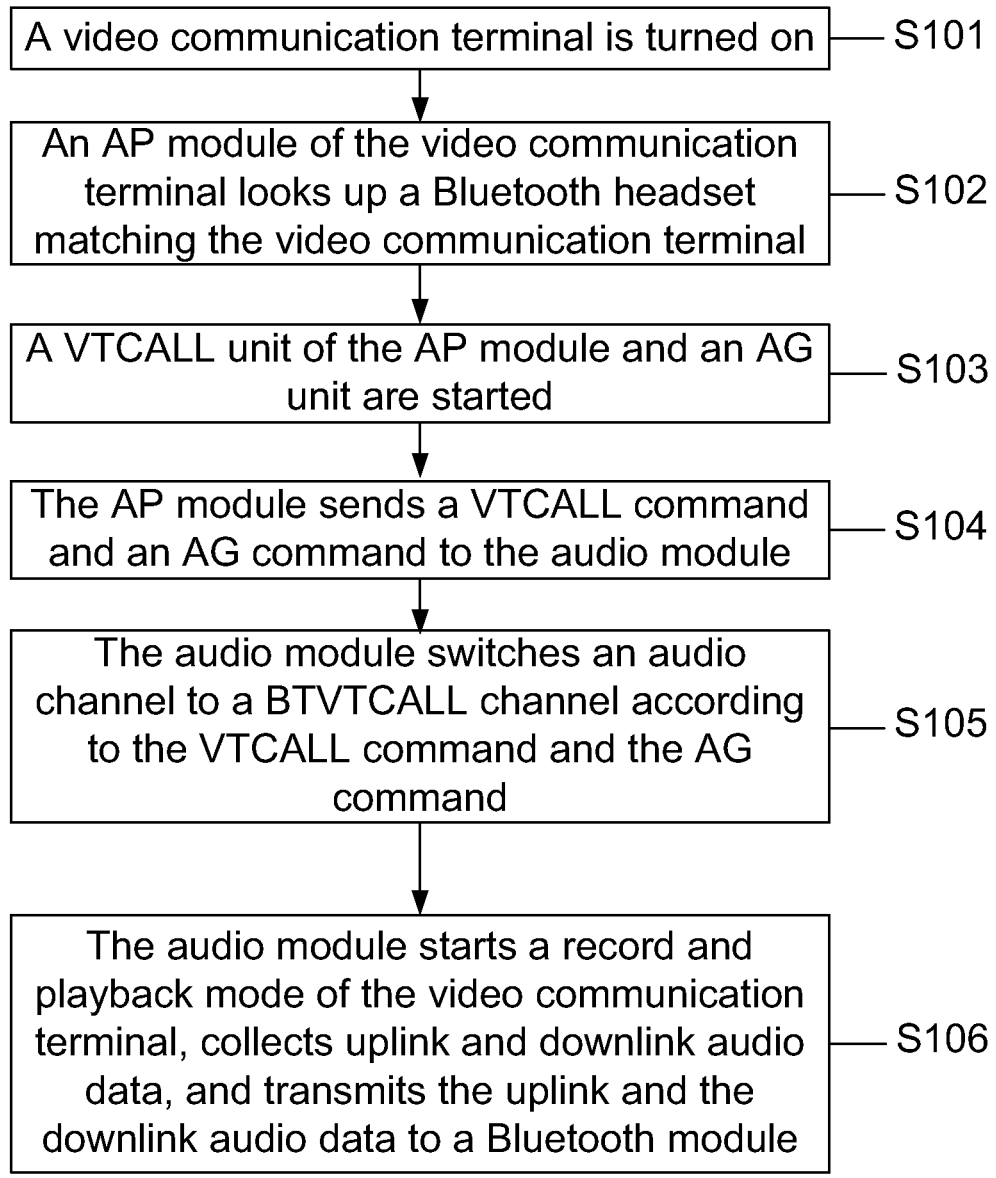
FIG. 3 illustrates a flowchart of a method of implementing a video call with a Bluetooth-based headset provided by an embodiment of the present invention.
Figure 3:
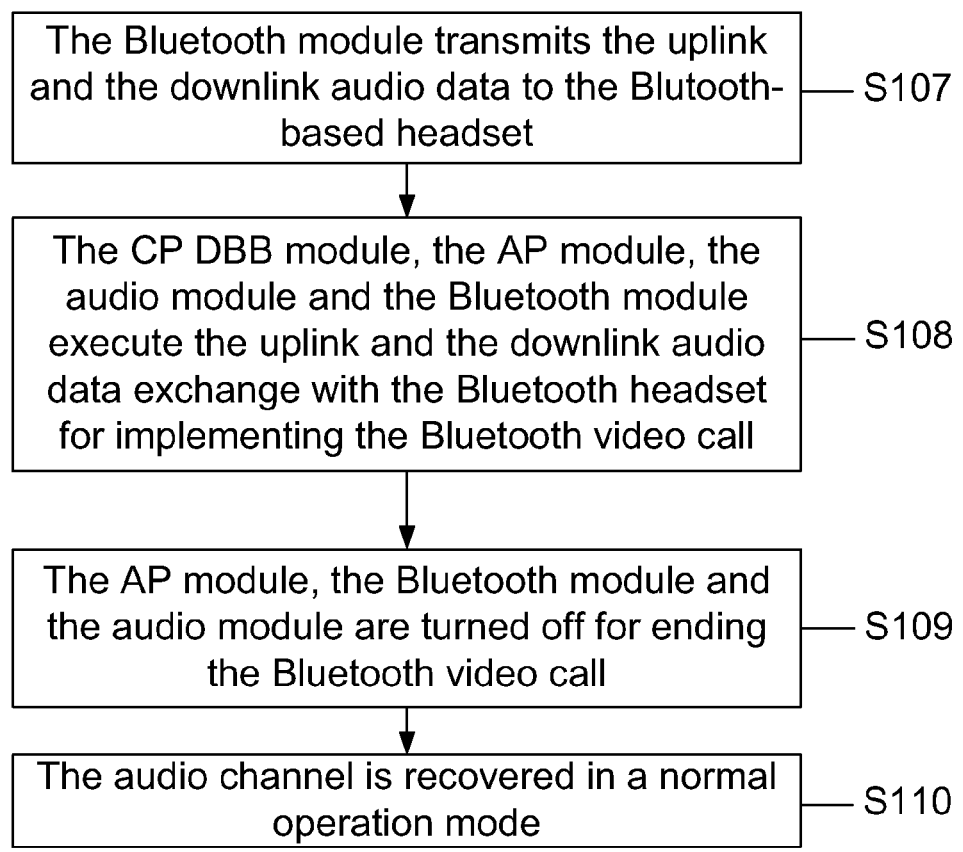

Based on the above-mentioned video communication terminal, the embodiment of the present invention further provides a corresponding method for implementing a video call with a Bluetooth-based headset. Please refer to FIG. 3. The method is implementing by calling interfaces, transferring parameters and sharing data and particularly comprises the following steps.

S101, a video communication terminal is turned on.

S102, an AP module of the video communication terminal looks up a Bluetooth headset matching the video communication terminal.

S103, a VTCALL unit of the AP module and an AG unit are started.

In the present embodiment, the video communication terminal is a 3G mobile phone. Before the VTCALL unit and the AG unit are started, a dial pad of the 3G mobile phone is required to be entered through a system layer of the AP module for executing a VTCALL.

S104, the AP module sends a VTCALL command and an AG command to the audio module.

S105, the audio module switches an audio channel to a BTVTCALL channel according to the VTCALL command and the AG command.

S106, the audio module starts a record and playback mode of the video communication terminal, collects uplink and downlink audio data, and transmits the uplink and the downlink audio data to a Bluetooth module.

When the audio module transmits the data to the Bluetooth module, PCM ports are utilized for executing full duplex transmission of the uplink and the downlink audio data, so as to make use of current hardware resources sufficiently.

S107, the Bluetooth module transmits the uplink and the downlink audio data to the Bluetooth headset. In the present embodiment, the Bluetooth module executes the uplink and the downlink audio data transmission with the Bluetooth headset in SCO.

S108, the CP DBB module, the AP module, the audio module and the Bluetooth module execute the uplink and the downlink audio data exchange with the Bluetooth headset for implementing the Bluetooth video call.

S109, the AP module, the Bluetooth module and the audio module are turned off for ending the Bluetooth video call.

S110, the audio channel is recovered in a normal operation mode.

Since the modules with respect to the video communication terminal are more, each of the modules is required to be designed independently and tested independently. After each of the modules is operated independently and normally, the modules are integrated for joint debugging.

In accordance with such a design principle, the modules with respect to the video communication terminal mainly comprise the AP module, the Bluetooth module and the audio module. Amongst, the AP module comprises the system layer of the AP module and the VTCALL unit, and the Bluetooth module comprises the AG unit and the SCO unit. Accordingly, each of the modules is required to be tested independently, and then the modules are integrated for joint debugging.

Figure 4:
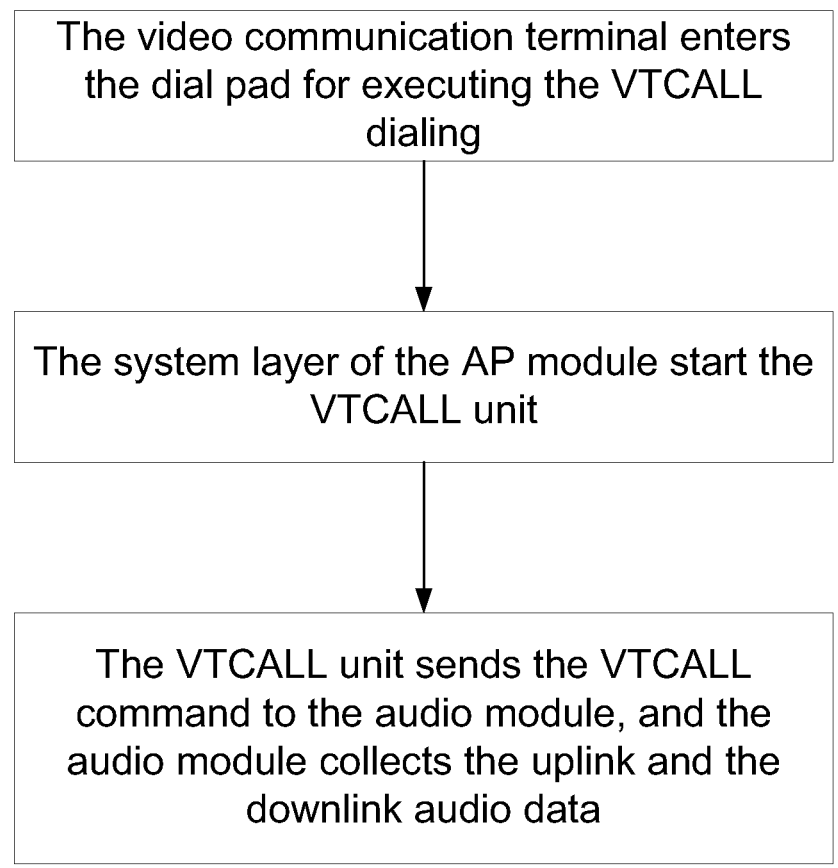
FIG. 4 illustrates an operational flowchart of a VTCALL unit of the present invention.

Please refer to FIG. 4, which illustrates an operational flowchart of the VTCALL unit. Firstly, the video communication terminal enters the dial pad for executing the VTCALL dialing. Then, the system layer of the AP module starts the VTCALL unit. Finally, the VTCALL unit sends the VTCALL command to the audio module, and the audio module collects the uplink and the downlink audio data.

Figure 5:
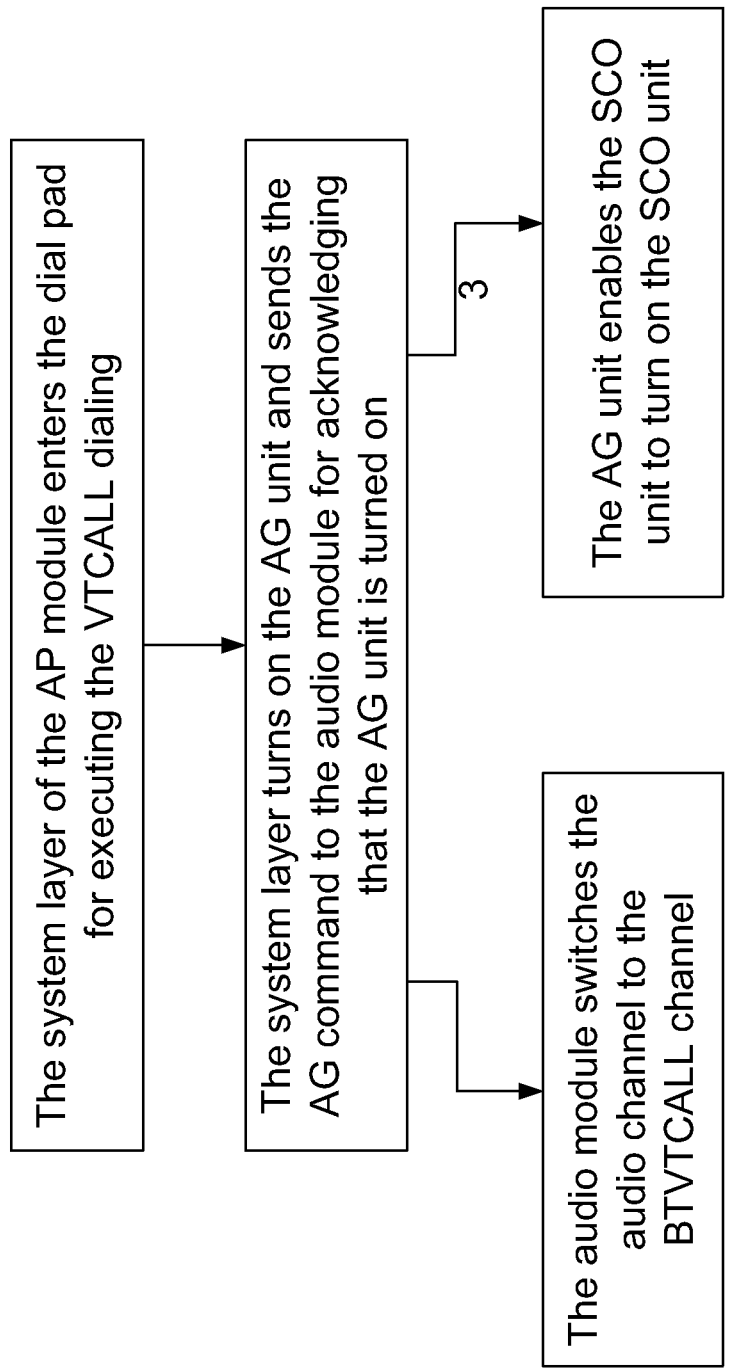
FIG. 5 illustrates an operational flowchart of an AG unit of the present invention.

Please refer to FIG. 5, which illustrates an operational flowchart of the AG unit. Firstly, the system layer of the AP module enters the dial pad for executing the VTCALL dialing. Then, the system layer turns on the AG unit and sends the AG command to the audio module for acknowledging that the AG unit is turned on. Finally, the audio module switches the audio channel to the BTVTCALL channel, and meanwhile the AG unit enables the SCO unit to turn on the SCO unit.

Figure 6:
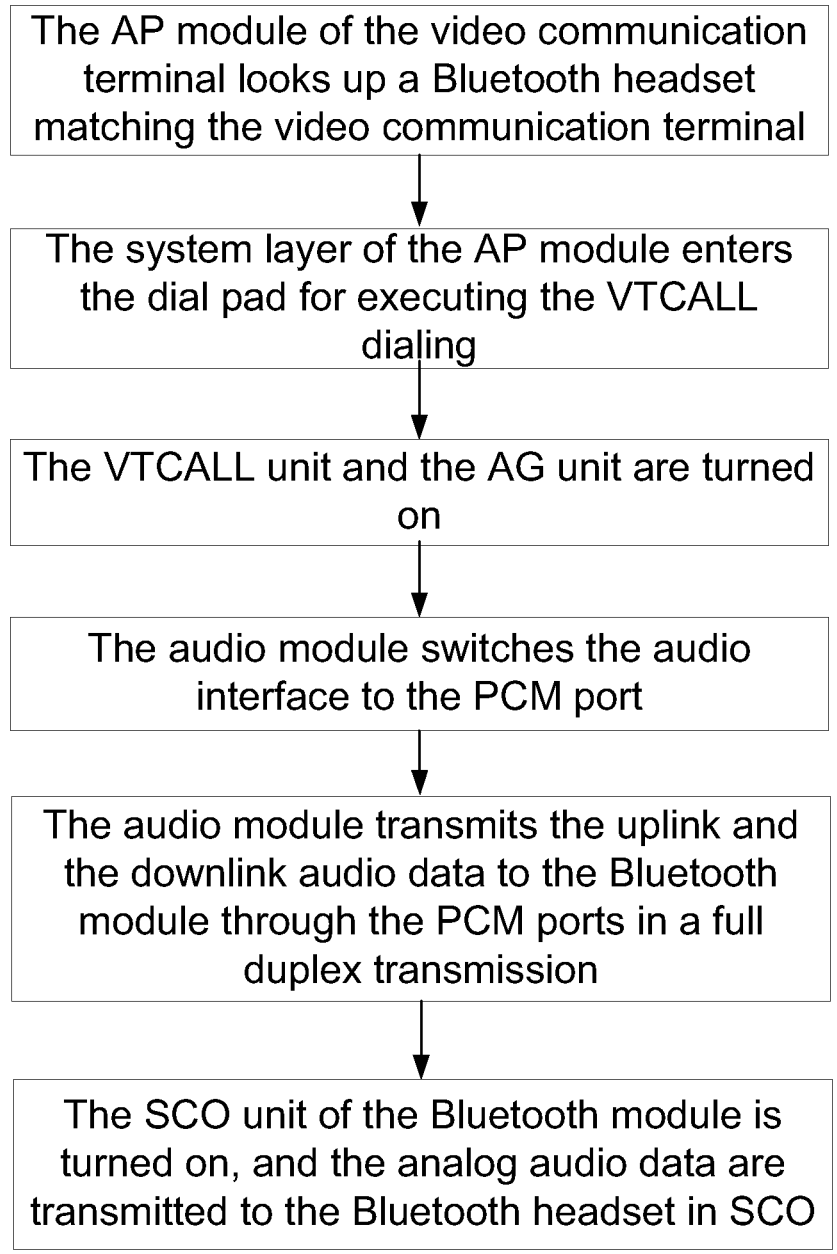
FIG. 6 illustrates an operational flowchart of an integral joint debugging for the AP modules, the Bluetooth module and the Bluetooth headset of the present invention.

Please refer to FIG. 6, which illustrates an operational flowchart of an integral joint debugging for the modules. In a first step, the AP module of the video communication terminal looks up a Bluetooth headset matching the video communication terminal. In a second step, the system layer of the AP module enters the dial pad for executing the VTCALL dialing. In a third step, the VTCALL unit and the AG unit are turned on. In a fourth step, the audio module switches the audio interface to the PCM port, that is, switches the audio channel to the BTVTCALL channel. In a fifth step, the audio module transmits the uplink and the downlink audio data to the Bluetooth module through the PCM ports in a full duplex transmission. In a sixth step, the SCO unit of the Bluetooth module is turned on, and the analog audio data (i.e. the uplink and the downlink audio data) are transmitted to the Bluetooth headset in SCO.

Therefore, the operational flow is quite important when technologies relate to several modules which coordinate with one another, otherwise unexpected results occur. For instance, functions are not stable, some functions are affected, and states of corresponding functions cannot be recovered normally and so on. The embodiment of the present invention provides a unified management method of link interface drive, which is called a link interface drive for short, thereby avoiding the above-mentioned problems effectively.

Figure 7:
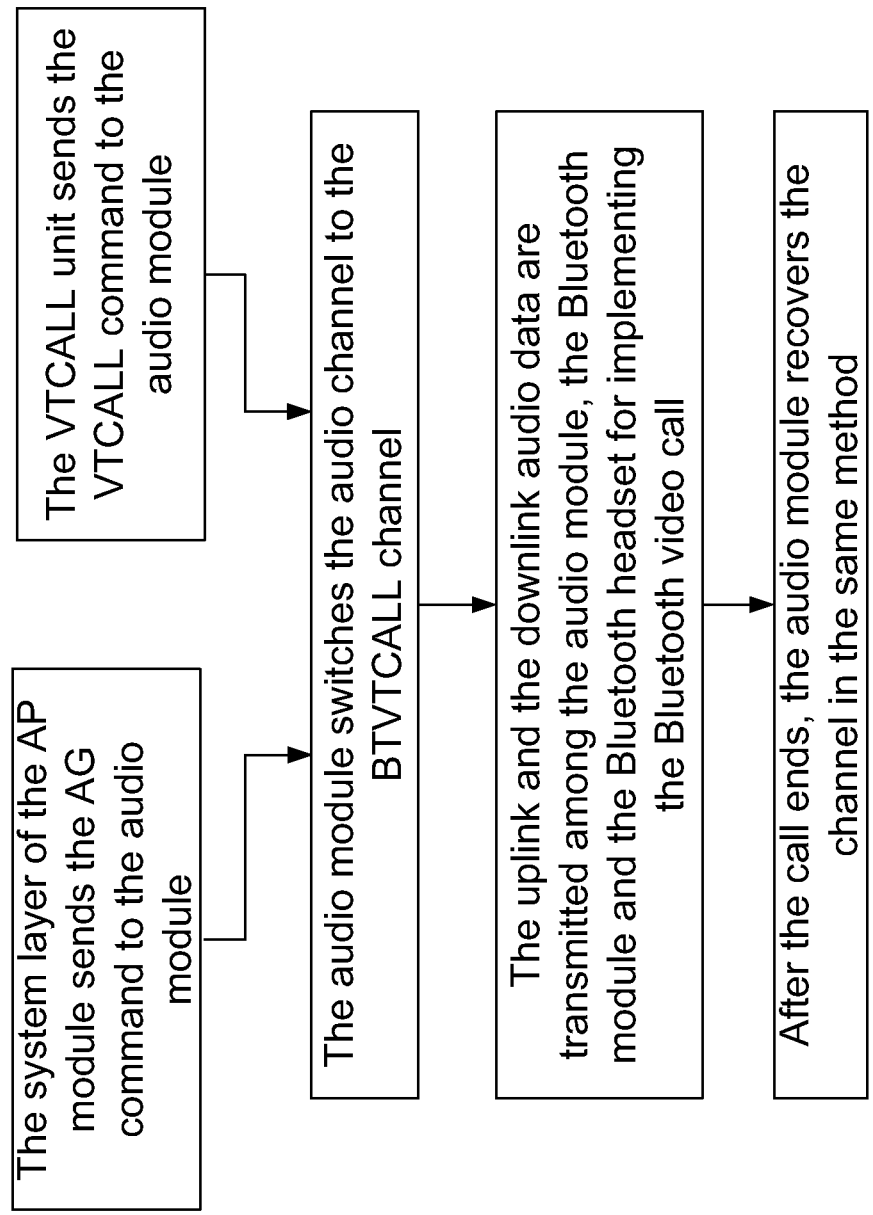
FIG. 7 illustrates an operational flowchart of a link interface drive of the present invention.

Please refer to FIG. 7. Firstly, the system layer of the AP module sends the AG command to the audio module, and meanwhile the VTCALL unit sends the VTCALL command to the audio module. Then, the audio module switches the audio channel to the BTVTCALL channel. Finally, the uplink and the downlink audio data are transmitted among the audio module, the Bluetooth module and the Bluetooth headset for implementing the Bluetooth video call. After the call ends, the audio module recovers the channel in the same method.

In the link interface drive method of the embodiment of the present invention, the AG unit links the other modules including the AP module, the Bluetooth module and the SCO unit for executing the unified management, thereby avoiding isolation and incoordination among the modules effectively. As a result, the coordination operations can be executed in good order, synchronously and effectively, thereby ensuring stability and quality of the Bluetooth video call.

Figure 8:
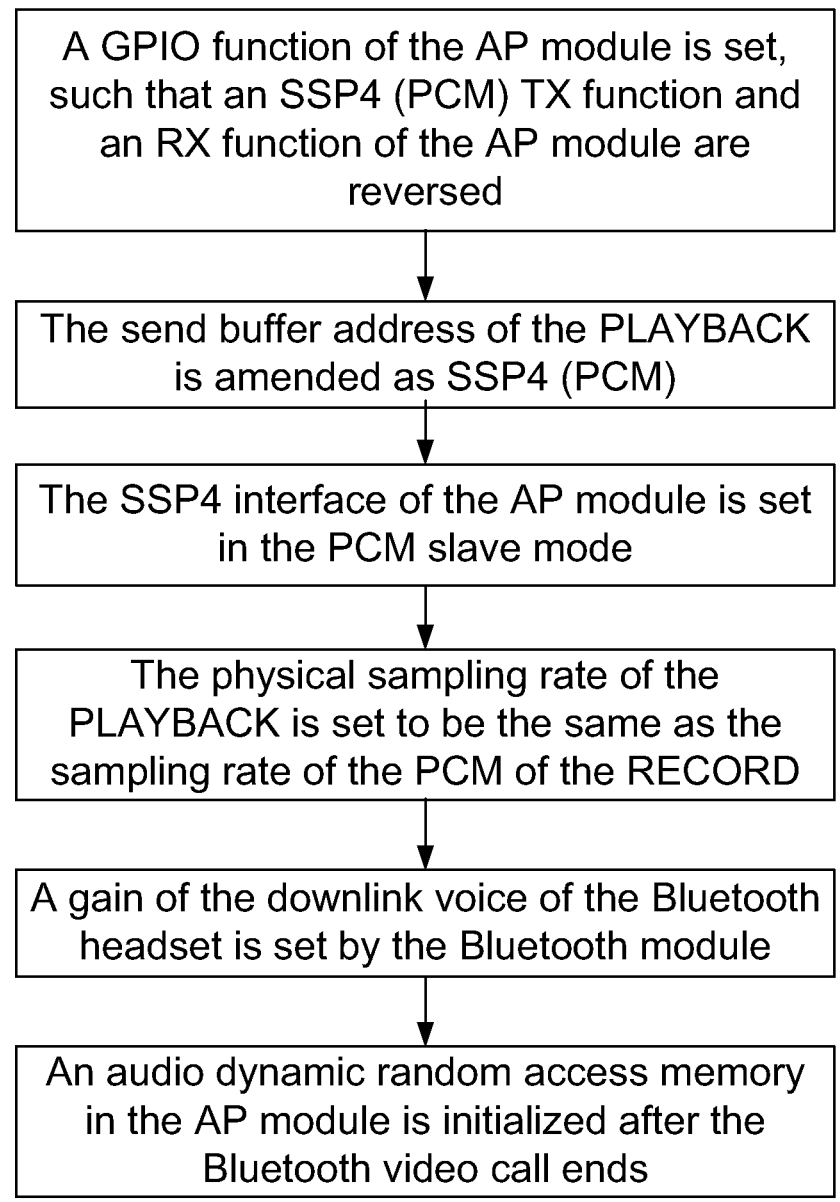
FIG. 8 illustrates an operational flowchart of switching to the BTVTCALL channel of the present invention.

Please refer to FIG. 8. A main process of switching the audio channel to the BTVTCALL channel with the audio module is described in the following.

In a first step, a GPIO function of the AP module is set, such that an SSP4 (PCM) TX function and an RX function of the AP module may be reversed.

In the present embodiment, the AP module and the Bluetooth module are linked through the PCM ports. The master and slave relation of the AP module and the Bluetooth module may be adjusted flexibly. In order to unifiedly manage the switches of the channels, the present embodiment of the present invention modifies the audio module and does not require modifying the Bluetooth module. Accordingly, the AP module is modified from the original PCM master module to the slave state, while the Bluetooth module remains in the master state.

Since the original AP module and the Bluetooth are in the master mode, the TX and RX of the SSP4 port are required to be connected reversely and the SSP4 TX and RX functions are reversed by setting the GPIO function of the AP module, so as to avoid modifying hardware for achieving the hardware compatibility.

Since the PLAYBACK and the RECORD of the SSP4 PCM port of the AP module are operated concurrently and switched from the original AP module/audio module to the AP module/Bluetooth module, the audio module switches the original CODEC channel (i.e. the audio channel) to the PCM channel of the Bluetooth module (i.e. a BTVTCALL module).

In a second step, the send buffer address of the PLAYBACK is changed as SSP4 (PCM).

In the audio module, the send buffer address of the PLAYBACK is changed from the original SSP3(I2S) to SSP4 (PCM).

In a third step, the SSP4 interface of the AP module is set in the PCM slave mode.

Since the PLAYBACK and the RECORD utilizes the PCM slave mode in the BTVTCALL channel, it is only required to set the PCM in the slave mode in the audio module instead of setting each of the PLAYBACK channel and the RECORD channel. As a result, efficiency is increased, and it is convenient to mange unifiedly.

In a fourth step, the physical sampling rate of the PLAYBACK is set to be the same as the sampling rate of the PCM of the RECORD.

Since the PLAYBACK channel is switched from the original SSP3 I2S mode (I2S bus mode) to the SSP4 PCM mode (PCM bus mode), the physical sampling rate of the PLAYBACK is required to be changed to be the same as the sampling rate of the PCM of the RECORD and data format conversion is executed in the layer for sampling rate conversion of the PLAYBACK in the audio module.

In a fifth step, a gain of the downlink voice of the Bluetooth headset is set by the Bluetooth module.

By setting the Bluetooth module, the gain of the downlink voice of the Bluetooth headset is modified. Since an interface of the Bluetooth module for setting a gain of a MIC (microphone) of the Bluetooth headset is blocked, the Bluetooth module only can set the gain of the downlink voice. The gain of the uplink voice is required to be set in an audio drive program. The setting task of the uplink voice is automatically completed after the AG unit turns on the SCO, and it is the prior art and omitted herein.

In a sixth step, an audio dynamic random access memory in the AP module is initialized after the Bluetooth video call ends.

In the present embodiment, the AP module recovers the I2S PLAYBACK channel correctly by initializing the audio dynamic random access memory in the AP module after the BTVTCALL, thereby preventing the audio dynamic random access memory from occurring suspension.

The embodiment of the present invention further provides an overall operational process of implementing the Bluetooth video call with the video communication terminal. Please refer to FIG. 9. The operational process comprises: (a) turning on a video communication terminal, and a system layer of an AP module of the video communication terminal looking up a Bluetooth headset matching the video communication terminal; (b) the system layer of the AP module entering a dial pad for executing a VTCALL dialing; (c) the system layer turning on a VTCALL unit (i.e. a VTCALL application procedure) and an AG unit of a Bluetooth module; (d) the system layer sending an AG command to an audio module, and meanwhile the VTCALL unit sending a VTCALL command to the audio module; (e) the audio module starting a RECORD and PLAYBACK functions of the video communication terminal and collecting uplink and downlink audio data of the VTCALL; (f) the audio module transmits the digital audio data through PCM interfaces in a dual duplex transmission; (g) the Bluetooth module transmitting analog audio data to the Bluetooth headset in a SCO; (h) a CP DBB module, the AP module, the audio module and the Bluetooth module executing the uplink and the downlink audio data exchange with the Bluetooth headset for implementing a Bluetooth video call; (i) ending the Bluetooth video call from the dial pad of the system layer of the AP module, and turning off the corresponding modules in the same method; (j) the system layer of the AP module acknowledging the audio module that the Bluetooth video call ends; (k) recovering the audio channel in a normal operation mode.

It can be seen from the above-mentioned method that main operations are completed by the audio module when the video communication terminal implements the BTVTCALL. Implementing methods of executing the PLAYBACK with the PCM ports, enabling the SSP of the AP module to simulate the PCM slave mode, recovering the playing channel from the PCM method to the I2S method and gaining the digital uplink voice are described in detail in the following.

1. the implementing method of executing the PLAYBACK with the PCM ports a. utilizing a general headset for channel adjusting, switching a PLAYBACK channel of the headset from an I2S PLAYBACK channel which is inputted to a headset channel to a PCM PLAYBACK channel, and then disabling the I2S port of the AP module which is originally enabled; b. changing the PLAYBACK channel from the original I2S port to the PCM port; c. changing an information channel of the dynamic random memory access of the PLAYBACK from the original XLLP_DMAC_SSP_3_TX to XLLP_DMAC_SSP_4_TX; d. setting the sampling rate of the PLAYBACK channel for executing the data format conversion, that is, converting playing audio data stream transmitted by the AP module to data in PCM format, setting the sampling rate of the PLAYBACK channel to be the same as the sampling rate of the RECORD channel, and changing the sampling rate in an intermediate layer of the PLAYBACK channel; e. the voice, which is played by the PCM port, being heard from the general headset after the above-mentioned steps, then switching the channel to a channel of the Bluetooth headset for implementing the PLAYBACK through the PCM port.

2. the implementing method of enabling the SSP of the AP module to simulate the PCM slave mode First, since the SSP4 port of the AP module is changed from the original PCM port master mode to the PCM port slave mode, SSP4 TX and RX of the AP module are required to be reversed. Herein, only the GPIO function selection of the SSP4 port is required to be changed. ALT_FN1 of the AP module is changed to ALT_FN5.

Second, in order to set the SSP4 PCM slave mode, a register address of setting the master and slave mode of the SSP port is found from a register sscr1 in the AP module and shown in the following:

| 25 | R/W | SCLKDIR | SSP Serial Bit Rate Clock (SSPSCLKx) Direction: 0 = Master mode, SSPx port drives SSPSCLKx. 1 = Slave mode, SSPx port receives SSPSCLKx. |
|---|---|---|---|
| 24 | R/W | SFRMDIR | SSP Frame (SSPSFRMx) Direction: 0 = Master mode, SSPx port drives SSPSFRMx. 1 = Slave mode, SSPx port receives SSPSFRMx. |

The two bits are directions of setting PCM_CLK and PCM_FRAME of the AP module, and they are set to be "1".

Third, in order to verify a full duplex operation of the PCM port, i.e. the PLAYBACK and the RECORD are operated concurrently, Loopback Mode (local loop) of the SSP port of the AP module is utilized for implementing an internal loop between transmit and receive of the PCM port. That is, the PLAYBACK and the RECORD are automatically looped. An address is shown in the following table:

| 2 | R/W | LBM | Loopback Mode (Test Mode Bit): 0 = Normal serial port operation is enabled. 1 = Output of TX serial shifter is internally connected to input of RX serial shifter. |
|---|---|---|---|

3. the implementing method of recovering the PLAYBACK channel from the PCM method to the I2S method Due to a DMA mechanism of the AP module, if the PLAYBACK channel is directly recovered to the I2S method after the PLAYBACK operation in the PCM mode, a DMA buffer suspends. Therefore, the Audio DMA of the AP module is required to be reinitialized. Since the setting of the Audio DMA and an interrupting process of the playing are closely connected with each other, the interrupting process of the PLAYBACK is required to be rebuilt (i.e. reinitializing the AP module).

4. the implementing method of gaining the digital uplink voice

Figure 9:
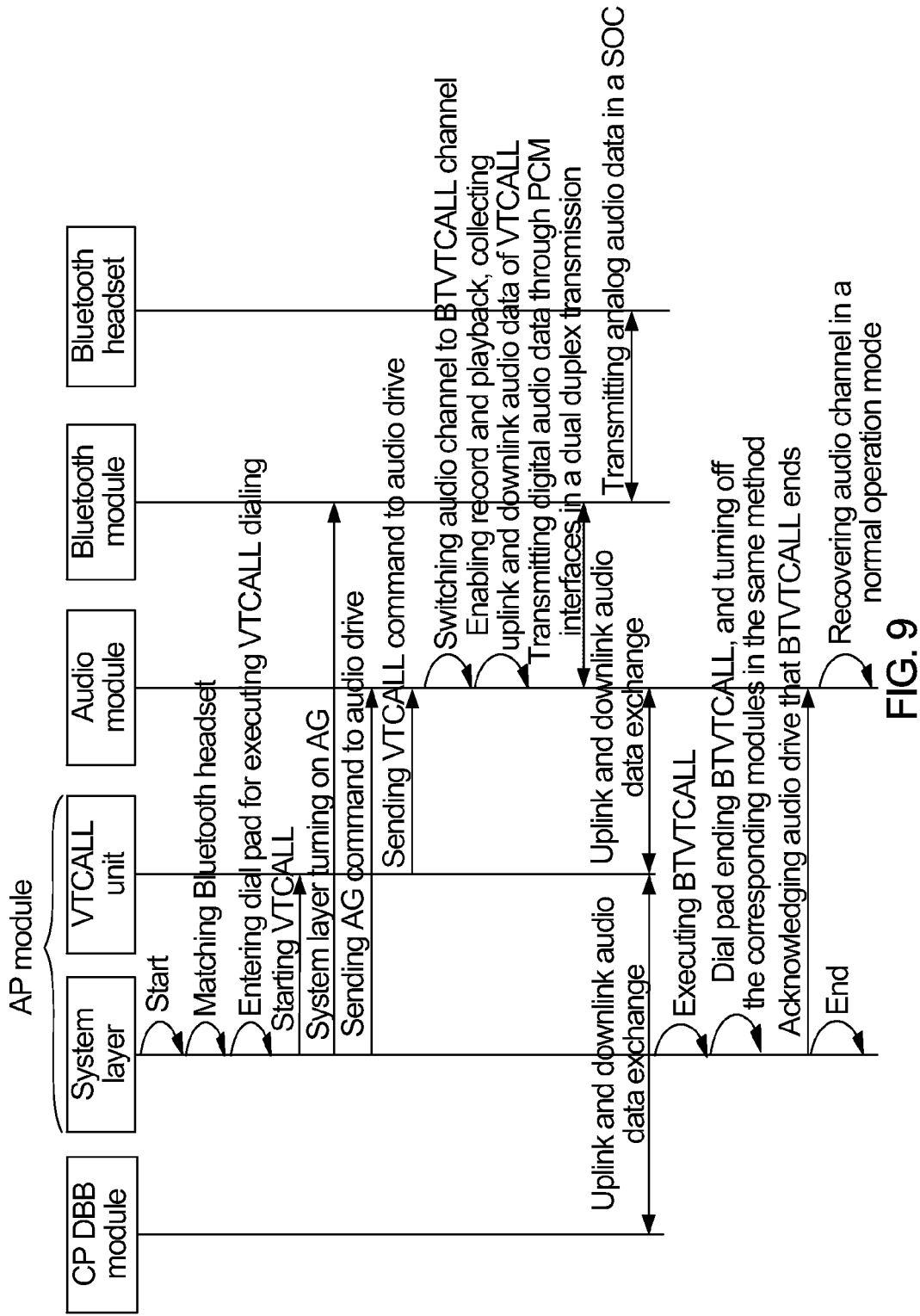
FIG. 9 illustrates an operational flowchart of implementing a Bluetooth video call with the video communication terminal of the present invention.

It can be seen from the operational flow in FIG. 9 that the modules for amplifying the uplink voice comprise the Bluetooth module and the audio module. In accordance with the signal amplifying principle, gaining signals includes two stages.

A first stage is a simulating gain amplification. That is, the Bluetooth module executes a MIC gain amplification. This operation may be completed automatically after the video communication terminal is linked with the Bluetooth headset. In order to be compatible with the general call of the Bluetooth headset, the simulating gain amplification may not be too great and is made such that the general Bluetooth call and the Bluetooth video call are clear.

A second stage is a digital gain amplification. A digital gain amplification function for the RECORD is added in the audio module. The audio design of the AP module does not have such a function. The digital gain amplification function for the PLAYBACK has been implemented. As a result, design of the digital gain amplification function for the RECORD in the present embodiment of the present invention may be referred to the digital gain amplification function for the PLAYBACK.

In summary, the method for implementing the video call with the Bluetooth-based headset and the video communication terminal modify software to change the PLAYBACK channel from the original SSP3 I2S mode to the SSP4 PCM mode (Pulse Code Modulation), and to change the RECORD channel from the original AP module/audio module to the AP module/Bluetooth module mode, and link the other modules including the AP module, the Bluetooth module and the SCO (synchronous connection-oriented) by the AG unit, thereby implementing the Bluetooth video call and achieving the following benefits without modifying the hardware design.

First, in a situation that the hardware design is not modified, the Bluetooth video call is implemented by modifying the software, and the PLAYBACK and the RECORD are transmitted through the PCM ports in the full duplex operation. The current hardware resources are used sufficiently, and the cost is decreased significantly.

Second, the uplink and the downlink audio data are transmitted in SCO, which only requires that the Bluetooth headset supports the SCO function and is compatible with the Bluetooth headset which does not support A2DP (stereo Bluetooth headset). As a result, the Bluetooth video call is really implemented, and requirements for the Bluetooth headset are not restricted. The application range is wide, thereby increasing a usage range of the video communication terminal.

The present invention adopts the designed link interface drive to link the VTCALL unit (video telephone call), the audio module, the SCO module and the AG unit for implementing the BTVTCALL (Bluetooth video telephone call). Communications and parameter transmissions among the modules are utilized with particular interfaces (including standard interfaces of Win mobile system and interfaces which are user-defined), and the data sharing is in a memory. Accordingly, the design is hierarchical, and interfaces may be called clearly. Communication stability among the modules is excellent and efficiency is great.

For the unified management, the present invention mainly modifies the audio drive (i.e. the audio module). The other modules are coordinated with and adjusted without being modified greatly. This includes two advantages. The first advantage is a high portability. Since transferring several modules is more complicated than transferring one module at the time of transferring the functions. The present invention only requires transferring the audio drive. Accordingly, the unstable phenomenon and a problem that the interfaces are disorderly do not occur. The second advantage is convenient to manage unifiedly. Transferring one module makes the flow of the link interface drive simply and efficient.

With the continuous development of the 3G technologies, the video call is increasingly important, and the usage frequency is getting high. Utilizing various audio devices for executing the video call may meet people's requirements. The usage of the Bluetooth headset is a trend, and utilizing the Bluetooth headset to make the video call is a trend as well and will be a necessary function of the video communication terminal.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A method for implementing a video call with a Bluetooth-based headset, wherein, the method comprises the following steps:
(A) turning on a video communication terminal;
(B) an AP module of the video communication terminal looking up a Bluetooth headset matching the video communication terminal;
(C) starting a VTCALL unit of the AP module and an AG unit of a Bluetooth module;
(D) the AP module sending a VTCALL command and an AG command to the audio module;
(E) the audio module switching an audio channel to a BTVTCALL channel according to the VTCALL command and the AG command;
(F) the audio module starting a recording and playing mode of the video communication terminal, collecting uplink and downlink audio data, and transmitting the uplink and the downlink audio data to the Bluetooth module;
(G) the Bluetooth module transmitting the uplink and the downlink audio data to the Bluetooth headset;
(H) a CP DBB module, the AP module, the audio module and the Bluetooth module executing the uplink and the downlink audio data exchange with the Bluetooth headset for implementing a Bluetooth video call.

2. The method for implementing the video call with the Bluetooth-based headset of claim 1, wherein, the method further comprises the following steps after the step (H):
(I) turning off the AP module, the Bluetooth module and the audio module for ending the Bluetooth video call;
(J) recovering the audio channel in a normal operation mode.

3. The method for implementing the video call with the Bluetooth-based headset of claim 1, wherein, the method further comprises the following step before the step (C):
(C0) the AP module executing a VTCALL dialing.

4. The method for implementing the video call with the Bluetooth-based headset of claim 1, wherein, the step (E) further comprises:
(E1) setting a GPIO function of the AP module, so as to reverse SSP4 TX and RX of the AP module;
(E2) amending a send buffer address of playing as SSP4;
(E3) setting an SSP4 interface of the AP module as a PCM slave mode;
(E4) setting a physical sampling rate of the playing to be the same as a sampling rate of PCM of recording;
(E5) setting a gain of a downlink voice of the Bluetooth headset through the Bluetooth module.

5. The method for implementing the video call with the Bluetooth-based headset of claim 2, wherein, the normal operation mode comprises a general voice recording and playing operation mode and a general Bluetooth call mode.

6. The method for implementing the video call with the Bluetooth-based headset of claim 1, wherein, when the audio module transmits the audio data to the Bluetooth module, the uplink and the downlink audio data are transmitted in a full duplex through PCM ports.

7. A video communication terminal for implementing a video call with a Bluetooth-based headset, wherein, the video communication terminal, which is a 3G mobile phone, comprises:

an AP module for implementing various interface operations of the video communication terminal;
an audio module for switching an audio channel to a BTVTCAL channel, then collecting uplink and downlink audio data, and transmitting the uplink and downlink audio data to a Bluetooth module;
the Bluetooth module for executing data transmission; and
a CP DBB module for executing data transmission with the AP module,
the AP module linked with the audio module and the CP DBB module, the Bluetooth module linked with the AP module, the audio module and a Bluetooth headset;
wherein the AP module comprises a system layer and a VTCALL unit, the system layer is utilized for looking up the Bluetooth headset matching the video communication terminal, executing a VTCALL dialing, turning on the VTCALL unit and an AG unit of the Bluetooth module; the VTCALL unit is utilized for sending a VTCALL command to the audio module.

8. The video communication terminal for implementing the video call with the Bluetooth-based headset of claim 7, wherein, further comprises a CP DBB module for executing data transmission with the AP module, the CP DBB module is linked with the AP module.

9. The video communication terminal for implementing the video call with the Bluetooth-based headset of claim 7, wherein, the video communication terminal is a 3G mobile phone.

10. The video communication terminal for implementing the video call with the Bluetooth-based headset of claim 7, wherein the system layer enters a dial pad for executing the VTCALL dialing.

11. The video communication terminal for implementing the video call with the Bluetooth-based headset of claim 7, wherein the audio module decodes and encodes audio signals outputted by the AP module and the Bluetooth module.

12. The video communication terminal for implementing the video call with the Bluetooth-based headset of claim 7, wherein the Bluetooth module executes data transmission with the Bluetooth headset according to a control command of the AP module.

13. The video communication terminal for implementing the video call with the Bluetooth-based headset of claim 7, wherein the system layer sends an AG command to the audio module.

14. The video communication terminal for implementing the video call with the Bluetooth-based headset of claim 7, wherein when the uplink and the downlink audio data are transmitted in SCO in the video communication terminal, PCM ports are utilized between the AP module and the Bluetooth module for implementing a Bluetooth video call.

15. A video communication terminal for implementing a video call with a Bluetooth-based headset, wherein, the video communication terminal comprises:
an AP module for implementing various interface operations of the video communication terminal;
an audio module for switching an audio channel to a BTVTCAL channel, then collecting uplink and downlink audio data, and transmitting the uplink and downlink audio data to a Bluetooth module; and
the Bluetooth module for executing data transmission;
the AP module linked with the audio module, the Bluetooth module linked with the AP module, the audio module and a Bluetooth headset;
wherein the AP module comprises a system layer and a VTCALL unit, the system layer is utilized for looking up the Bluetooth headset matching the video communication terminal, executing a VTCALL dialing, turning on the VTCALL unit and an AG unit of the Bluetooth module; the VTCALL unit is utilized for sending a VTCALL command to the audio module.

* * * * *